(12) United States Patent
Cornwall

(10) Patent No.: US 7,913,718 B1
(45) Date of Patent: Mar. 29, 2011

(54) NOISE REDUCTION SYSTEM

(76) Inventor: Kenneth R. Cornwall, Duluth, GA (US)

( * ) Notice: Subject to any disclaimer, the term of this patent is extended or adjusted under 35 U.S.C. 154(b) by 0 days.

(21) Appl. No.: 12/348,946

(22) Filed: Jan. 6, 2009

Related U.S. Application Data

(60) Provisional application No. 61/020,217, filed on Jan. 10, 2008, provisional application No. 61/041,627, filed on Apr. 2, 2008.

(51) Int. Cl.
*F16L 11/00* (2006.01)

(52) U.S. Cl. ........ 138/112; 138/114; 138/113; 138/157; 138/161

(58) Field of Classification Search .......... 138/112–114, 138/157–163
See application file for complete search history.

(56) References Cited

U.S. PATENT DOCUMENTS

| | | | | |
|---|---|---|---|---|
| 1,909,075 A | * | 5/1933 | Ricker et al. | 285/123.3 |
| 2,603,347 A | * | 7/1952 | Fish | 206/317 |
| 2,706,495 A | * | 4/1955 | Risley | 138/148 |
| 3,559,660 A | * | 2/1971 | Rollins | 138/149 |
| 3,732,894 A | | 5/1973 | Botsolas | 138/178 |
| 3,750,058 A | * | 7/1973 | Bankert et al. | 333/242 |
| 3,789,129 A | * | 1/1974 | Ditscheid | 174/28 |
| 3,877,491 A | | 4/1975 | Thastrup | 138/149 |
| 3,899,007 A | * | 8/1975 | Miller | 138/114 |
| 3,964,754 A | * | 6/1976 | Murai et al. | 277/621 |
| 4,124,040 A | * | 11/1978 | Miller | 138/148 |
| 4,250,927 A | * | 2/1981 | Newburg | 138/113 |
| 4,250,928 A | * | 2/1981 | Nishikawa | 138/113 |
| 4,309,007 A | | 1/1982 | Logsdon | 248/56 |
| 4,385,777 A | | 5/1983 | Logsdon | 285/12 |
| 4,807,669 A | | 2/1989 | Prestidge, Sr. | 138/178 |
| 4,884,596 A | | 12/1989 | Byers et al. | 137/801 |
| 4,886,305 A | * | 12/1989 | Martin | 285/123.17 |
| 4,930,544 A | * | 6/1990 | Ziu | 138/113 |
| 5,069,255 A | * | 12/1991 | Muszynski | 138/149 |
| 5,141,184 A | * | 8/1992 | Ziu | 248/49 |
| 5,351,996 A | | 10/1994 | Martin | 285/64 |
| 5,400,828 A | * | 3/1995 | Ziu et al. | 138/113 |
| 5,497,809 A | * | 3/1996 | Wolf | 138/113 |
| 5,803,127 A | * | 9/1998 | Rains | 138/113 |
| 5,851,330 A | | 12/1998 | Cridland et al. | 156/229 |
| 5,862,834 A | * | 1/1999 | Ziu | 138/113 |
| 6,155,378 A | * | 12/2000 | Qatu et al. | 181/255 |
| 6,241,199 B1 | | 6/2001 | Ismert | 248/56 |
| 6,341,626 B1 | | 1/2002 | Davenport et al. | 138/110 |
| 6,840,284 B2 | * | 1/2005 | Schippl et al. | 138/113 |
| 7,156,126 B2 | * | 1/2007 | Topek et al. | 138/117 |
| 7,159,620 B2 | | 1/2007 | Kissell | 138/149 |

* cited by examiner

*Primary Examiner* — Patrick F Brinson
(74) *Attorney, Agent, or Firm* — Mary M. Moyne; Fraser Trebilcock Davis & Dunlap, P.C.

(57) ABSTRACT

A noise reduction system for use with a DWV system to reduce the noise emitted from the DWV system when waste water flows through the DWV system. The noise reduction system includes a sleeve and a spacer. The noise reduction system is mounted on the pipes and fittings of the DWV system.

12 Claims, 3 Drawing Sheets

NOISE REDUCTION SYSTEM

CROSS-REFERENCES TO RELATED APPLICATIONS

Figure 1:
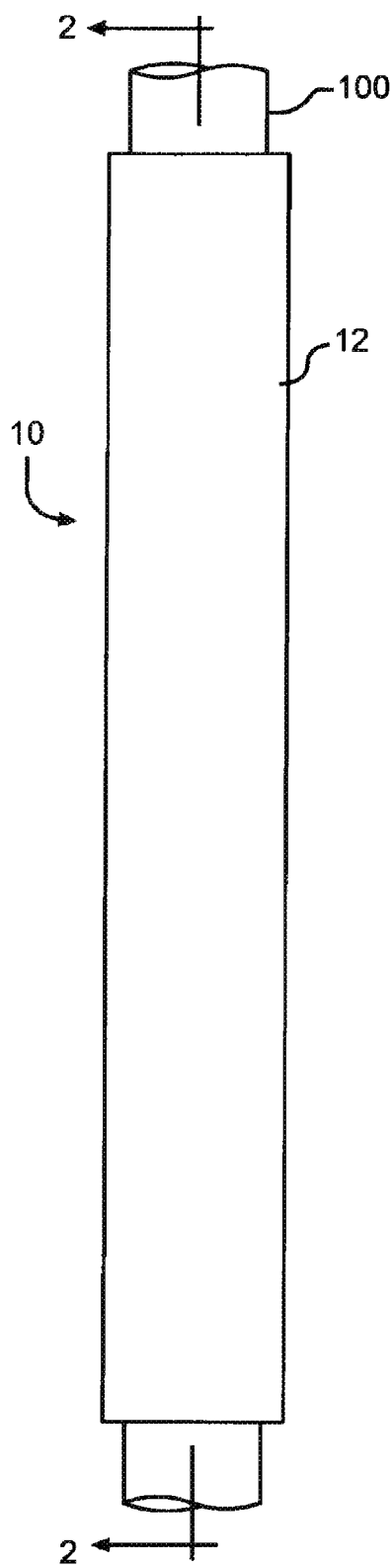

This application claims the benefit of U.S. Provisional Application No. 61/020,217, filed Jan. 10, 2008, and U.S. Provisional Application No. 61/041,627, filed Apr. 2, 2008, which are hereby incorporated herein by reference in their entirety, except that the present application supersedes any portion of the above referenced applications which is inconsistent with the present application.

STATEMENT REGARDING FEDERALLY SPONSORED RESEARCH OR DEVELOPMENT

Not Applicable

BACKGROUND OF THE INVENTION

Field of the Invention

The present invention relates to a noise reduction system for use in a drain waste and vent (DWV) system. In particular, the present invention relates to a sleeve which mounts around the outside of a polyvinylchloride (PVC) pipe or fitting of the DWV system to reduce the noise emitted from the pipe or fitting. A DWV system is a plumbing system having pipes and fittings which carries drainage, waste and sewer gases out of a building. The DWV system can include drain pipes, waste or soil pipes, vent stacks, and any other pipes and fittings used for the same purpose. When waste water is discharged into the DWV system, the various pipes and fittings of the DWV system emit sound or noise as the waste water moves through the DWV system. In the past, to reduce the noise emitted by the DVW system when waste water is discharged into the drain pipe, the fittings and pipes of the DWV system were constructed of cast iron. However, cast iron is expensive and difficult to install. Therefore, it is desirable to use PVC pipes and fittings in place of the cast iron pipes and fittings in the DWV system. However, DWV systems constructed using PCV pipes and fittings emit higher levels of noise than DWV systems using cast iron pipes and fittings. There remains a need for a noise reduction system for use with pipes and fittings of a DWV system which is inexpensive to manufacture and easy to install.

BRIEF SUMMARY OF THE INVENTION

A noise reduction system to be used with a DWV system to reduce the noise emitted from the DWV system when waste water flows through the system. The noise reduction system includes a sleeve and a spacer. The noise reduction system is mounted on the pipes and fittings of the DWV system. The sleeve is shaped to cover the entire exposed outer surface of the pipe or fitting of the DWV system. The spacer is positioned between the outer surface of the pipe or fitting and the inner surface of the sleeve. The spacer creates an air gap between the pipe or fitting and the sleeve. The air gap acts to isolate the pipe or fitting from the sleeve and from the surrounding atmosphere. The air gap absorbs the noise emitted from the pipe or fitting as waste water moves through the pipe or fitting. The air gap and the sleeve reduce the amount of noise from the pipe or fitting which actually reaches the surrounding atmosphere. In one (1) embodiment, the spacer and the sleeve are constructed of PVC and the fitting or pipe on which the noise reduction system is installed is constructed of PVC. In one (1) embodiment, the sleeve is constructed of multiple pieces so that the sleeve can be easily installed around the fitting or pipe after the DWV system has been installed. In one (1) embodiment, where the noise reduction system is installed on a pipe, the sleeve is constructed of two (2) semicircular pipes which mate together to encircle the pipe. In one (1) embodiment, the spacer and sleeve are secured around the fitting or pipe by an adhesive. In one (1) embodiment, the pieces of the sleeve are secured together using a snap fastener.

The present invention relates to a noise reduction system for reducing the noise level in a pipe of a DWV system, which comprises a spacer mounted on an outer surface of the pipe, and a sleeve mounted on the spacer on a side opposite the pipe so that the sleeve is spaced apart from the outer surface of the pipe and an air gap is formed between the outer surface of the pipe and the sleeve wherein the air gap absorbs sound emitted by the pipe.

Further, the present invention relates to a method for soundproofing a plumbing fitting constructed of PVC, which comprises the steps of providing a sleeve having a shape similar to a shape of the fitting, providing a spacer, mounting the spacer on an outer surface of the fitting, and mounting the sleeve on the spacer on a side opposite the fitting so that the sleeve covers essentially all of an exposed, outer surface of the fitting and is spaced apart from the outer surface of the fitting so that an air gap is formed between the outer surface of the fitting and the sleeve wherein the air gap absorbs sound emitted by the fitting.

Still further, the present invention relates to a method for soundproofing a pipe constructed of PVC, the pipe having opposed ends forming a longitudinal axis of the pipe, which comprises the steps of providing a sleeve having a first piece and a second piece, each piece having a first end and a second end forming a longitudinal axis of each piece, providing at least one spacer, mounting the spacer on an outer surface of the pipe, mounting the first piece of the sleeve on the spacer so that the longitudinal axis of the first piece is parallel to the longitudinal axis of the pipe, and mounting the second piece of the sleeve on the spacer so that the longitudinal axis of the second piece is parallel to the longitudinal axis of the pipe wherein when the first and second pieces are mounted on the spacer on the pipe, an air gap is formed between the outer surface of the pipe and the sleeve and wherein the air gap acts to absorb sound emitted by the pipe.

The substance and advantages of the present invention will become increasingly apparent by reference to the following drawings and the description.

BRIEF DESCRIPTION OF THE DRAWING(S)

FIG. 1 is a front view of the sleeve 12 of the noise reduction system 10 mounted on the pipe 100 of the DWV system.

Figure 2:
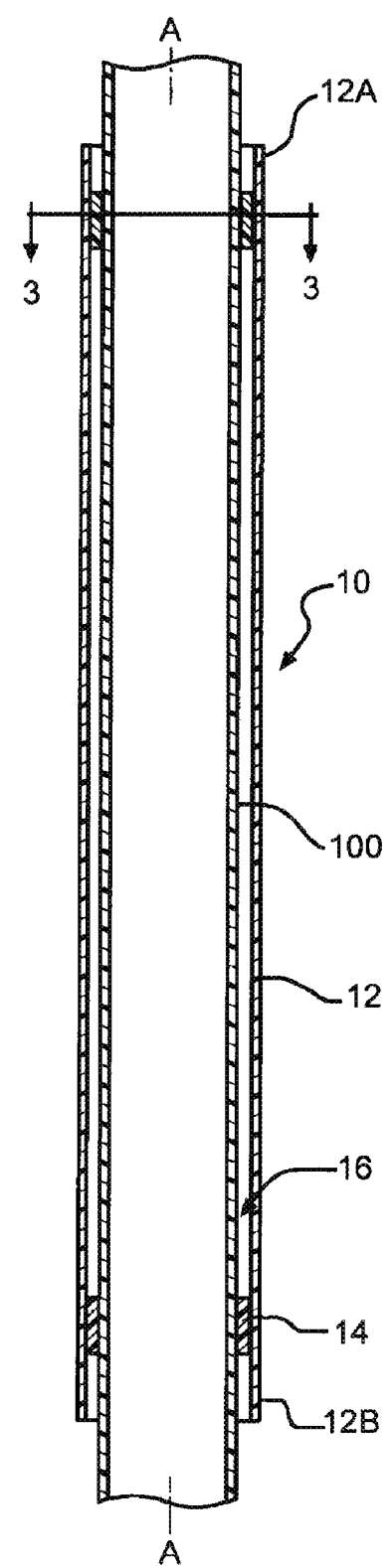

FIG. 2 is a cross-sectional view of FIG. 1 along the line 2-2 showing the spacers 14 and the air space 16 between the sleeve 12 and the pipe 100.

Figure 3:
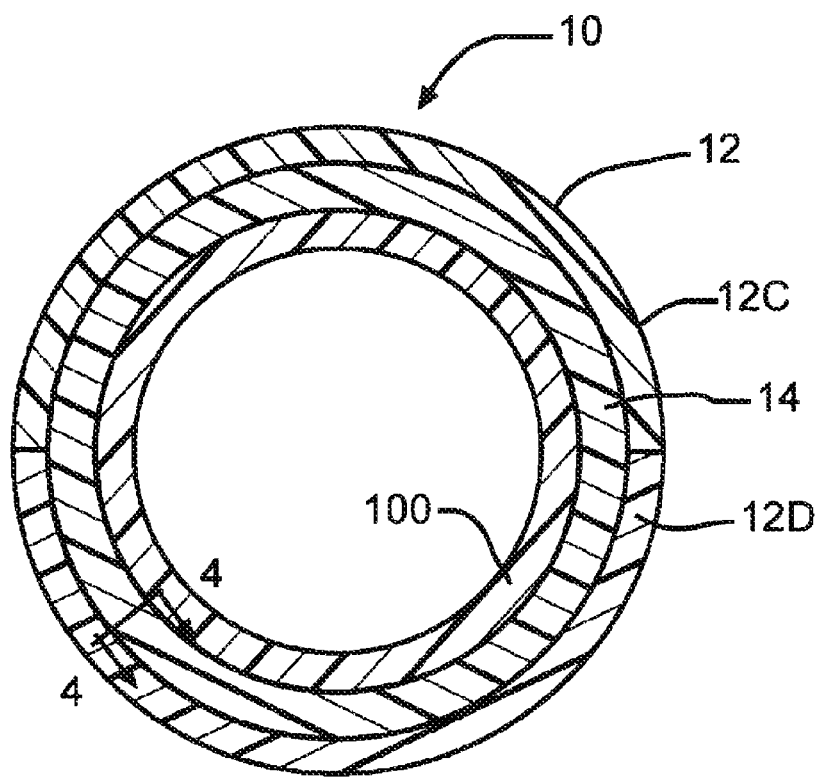

FIG. 3 is a cross-sectional view of FIG. 2 along the line 3-3 showing the sleeve 12, the spacer 14 and the pipe 100.

Figure 4:
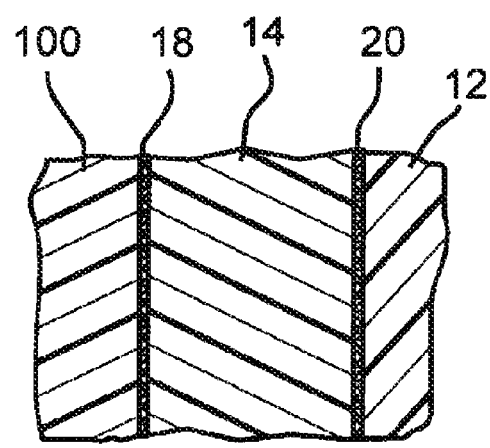

FIG. 4 is a cross-sectional view of FIG. 3 along the line 4-4 showing the adhesive 18 connecting the spacer 14 to the pipe 100 and showing the adhesive 20 connecting the sleeve 12 to the spacer 14.

Figure 5:
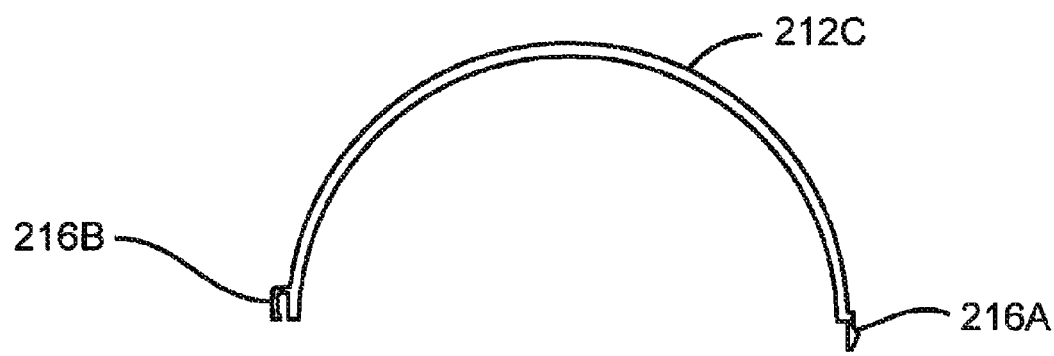

FIG. 5 is an end view of a second embodiment showing a first half pipe 212C of the sleeve 212 with the male portion 216A and female portion 216B of the snap fastener 216.

Figure 6:
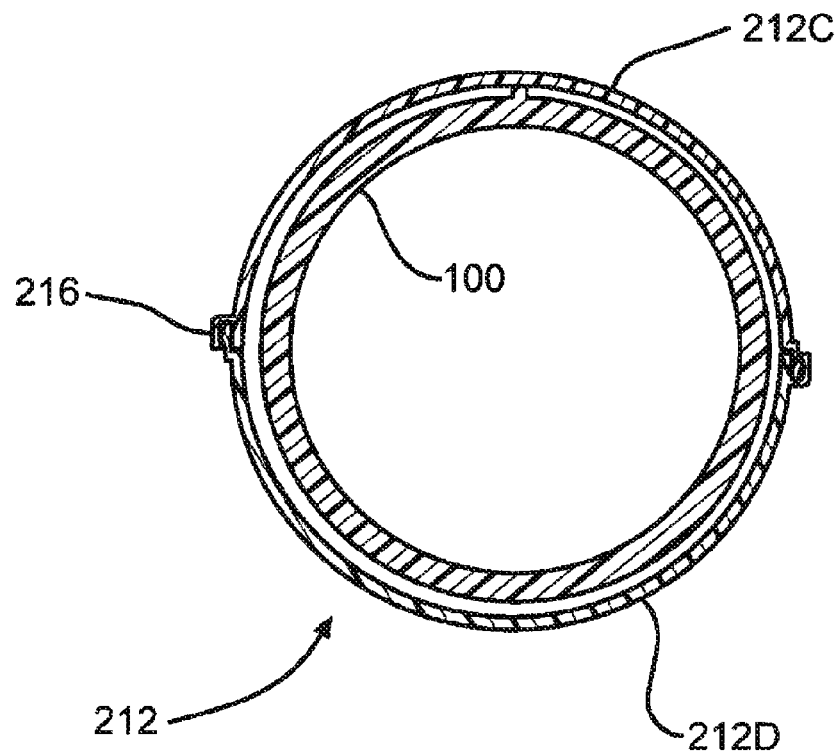

FIG. 6 is a cross-sectional view of a second embodiment of the sleeve 212 mounted on the pipe 100 without the spacers 14.

DETAILED DESCRIPTION OF THE INVENTION

The noise reduction system 10 of the present invention reduces the noise emitted from a pipe 100 or fitting of a DWV system when waste water is discharged into the DWV system. The noise reduction system 10 soundproofs the DWV system and thus reduces the noise or sound emitted by the system. In one (1) embodiment, the pipes 100 and fittings of the DWV system are constructed of PVC. The noise reduction system 10 includes a sleeve 12 and at least one (1) spacer 14.

The noise reduction system 10 is installed around the pipes 100 and fittings of the DWV system. The sleeve 12 has a shape similar to the pipe 100 or fitting on which the noise reduction system 10 is to be installed. In one (1) embodiment, the sleeve 12 is shaped and sized so as to cover the entire exposed outer surface of the pipe 100 or fitting. The exposed outer surface of the pipe 100 or fitting is the portion of the pipe 100 or fitting which is not inserted into an adjacent pipe or fitting. In one (1) embodiment, the sleeve 12 is constructed of multiple pieces to allow for easier mounting of the sleeve 12 on the pipe 100 or fitting of the DWV system. Constructing the sleeve 12 of multiple pieces enables the sleeve 12 to be mounted on the pipe 100 or fitting after the DWV system has been installed in the building or structure. In one (1) embodiment, the sleeve 12 is constructed of PVC. In one (1) embodiment, the sleeve 12 has a thickness of about 0.090 inches (2.29 mm).

In one (1) embodiment, the noise reduction system 10 is installed on a vertical drainage pipe 100 in a single stack DWV system (not shown). In this embodiment, the pipe 100 of the DWV system has a cylindrical shape and the sleeve 12 has a cylindrical shape. The sleeve 12 has opposed ends 12A and 12B with a center axis A-A extending though the center of the sleeve 12 between the ends 12A and 12B. In one (1) embodiment, the sleeve 12 has a length between the ends 12A and 12B essentially equal to the exposed length of the pipe 100 such that the sleeve 12 covers essentially the entire exposed length of the pipe 100. In this embodiment where the pipe 100 has a cylindrical shape, the inner diameter of the sleeve 12 is greater than the outer diameter of the pipe 100. In this embodiment, the sleeve 12 is constructed of two (2) pieces 12C and 12D. The first and second pieces 12C and 12D each have an essentially semi-circular cross-section. The first and second pieces 12C and 12D mate together to form the cylindrical sleeve 12. Each piece 12C and 12D of the sleeve 12 has opposed ends with longitudinal edges extending between the ends. In one (1) embodiment, the pieces 12C and 12D are identical. However, it is understood that the pieces 12C and 12D may not be semi-circular and may not be identical. In one (1) embodiment, the sleeve 12 is first constructed as a hollow cylinder. The cylinder is then cut to the correct length to accommodate the length of the pipe 100. Once the cylinder is the correct length, the cylinder is cut in half, lengthwise to create the two (2) pieces 12C and 12D of the sleeve 12.

In a second embodiment, the sleeve 212 has a cylindrical shape and is constructed of two (2) half pipes 212C and 212D each half pipe 212C and 212D having an essentially semi-circular shape with a semi-circular cross-section (FIG. 6). The half pipes 212C and 212D have opposed ends with first and second edges extending between the ends. Each of the half pipes 212C and 212D have a fastener 216 extending along the first and second edges. In one (1) embodiment, the fastener is a snap fastener 216 which has a male portion 216A which snaps into a female portion 216B. In one (1) embodiment, the first and second half pipes 212C and 212D are essentially identical and the male portion 216A of the snap fastener 216 extends along the first edge of the half pipe 216C or 216D and the female portion 216B of the snap fastener 216 extends along the second edge of the half pipe 216C or 216D. In one (1) embodiment, the snap fastener 216 is a permanent fastener such that when the male portion 216A of the snap fastener 216 is snapped into the female portion 216B of the snap fastener 216, the male and female portions 216A and 216B of the snap fastener 216 cannot be unsnapped or disengaged without damaging the snap fastener 216.

In one (1) embodiment where the pipe 100 has an outer diameter of approximately 3.5 inches (88.9 mm), the sleeve 12 has an inner diameter of approximately 3.6875 inches (93.66 mm). In one (1) embodiment, where the pipe 100 has an outer diameter of approximately 4.5 inches (114.3 mm), the sleeve 212 has an inner diameter of approximately 4.75 inches (120.65 mm) and an outer diameter of approximately 4.93 inches (125.22 mm). In the embodiment having the snap fastener 216, the outer diameter of the sleeve 212 at the snap fastener 216 is approximately 5.176 inches (131.470 mm) (FIG. 5).

A spacer 14 is mounted between the outer surface of the pipe 100 or fitting and the inner surface of the sleeve 12 (FIG. 2). The spacer 14 positions the sleeve 12 apart from the outer surface of the pipe 100 or fitting and creates an air gap 16 between the outer surface of the pipe 100 or fitting and the inner surface of the sleeve 12 (FIG. 2). In one (1) embodiment, there are multiple spacers 14. In one (1) embodiment, the spacer 14 completely encircles the pipe 100. The spacers 14 may be positioned on the outer surface of the pipe 100 or fitting in a net pattern or may be randomly positioned on the outer surface of the pipe 100 or fitting. It is understood that the spacers 14 can be positioned at multiple locations along the length of the pipe 100 or surface of the fitting as necessary to fully support the sleeve 12 spaced apart from the pipe 100 or fitting. In one (1) embodiment, where the sleeve 12 has a cylindrical shape, a spacer 14 is located on the pipe 100 adjacent each of the ends 12A and 12B of the sleeve 12. In one (1) embodiment, the spacer 14 is constructed of a rigid material. In one (1) embodiment, the spacer 14 is constructed of PVC. In another embodiment, the spacer 14 is constructed of a flexible material. In one (1) embodiment, the spacer 14 is constructed of foam. In one (1) embodiment, the spacer 14 is an adhesive strip which sticks to the outer surface of the pipe 100 or fitting and allows for securing the sleeve 12 to the outer surface of the pipe 100 or fitting. In one (1) embodiment, the spacer 14 has a thickness of about 0.125 inches (3.175 mm) so that the inner surface of the sleeve 12 is spaced apart from the outer surface of the pipe 100 or fitting a distance of at least 0.125 inches (3.175 mm) so that the air gap 16 has a thickness of approximately 0.125 inches (3.175 mm).

To install the noise reduction system 10 on the pipe 100 or fitting of the DWV system, the spacer 14 is positioned and secured on the pipe 100 or fitting. In one (1) embodiment, the spacer 14 is secured to the outer surface of the pipe 100 or fitting by an adhesive 18 (FIG. 4). However, it is understood that any well known means of securing the spacer 14 to the pipe 100 or fitting may be used. Once the spacer 14 is in place, the sleeve 12 is mounted around the pipe 100 or fitting and connected to the spacer 14. In one (1) embodiment, the inner surface of the sleeve 12 is secured to the spacer 14 on the side opposite the pipe 100 or fitting. In one (1) embodiment, the sleeve 12 is secured to the spacer 14 using an adhesive 20 (FIG. 4). However, it is understood that any means well known in the art can be used to secure the sleeve 12 to the spacer 14. In one (1) embodiment, the adhesive 20 is applied to the surface of the spacer 14 opposite the pipe 100 and the sleeve 12 is mounted on the spacer 14. In the embodiment where the sleeve 12 is constructed of two (2) pieces 12C and 12D, the first piece 12C of the sleeve 12 is mounted around the pipe 100 or fitting and moved inward until the inner surface of the sleeve 12 contacts the adhesive 20 on the spacer 14. In one (1) embodiment, the sleeve 12 is flexible and is contracted into contact with the spacer 14. Next, the second piece 12D of the sleeve 12 is mounted similarly to the first piece 12C on the remaining side of the pipe 100 so that the longitudinal edges of the second piece 12D are adjacent the longitudinal edges of the first piece 12C. In one (1) embodiment, where the sleeve 212 is constructed of half pipes 212C and 212D which have a snap fastener 216, the half pipes 212C and 212D of the sleeve 212 are mounted on the pipe 100 so that a first end of the first half pipe 212C is adjacent the second end of the second half pipe 212D so that the two half pipes 212C and 212D essentially encircle the pipe 100 and so that the male portion 216A of the snap fastener 216 on the first edge of the first half pipe 212C is adjacent and engages the female portion 216B of the snap fastener 216 on the second edge of the second half pipe 212D and similarly the female portion 216B of the snap fastener 216 on the second edge of the first half pipe 212C is adjacent and engages the male portion 216A of the snap fastener 216 on the first edge of the second half pipe 212D of the sleeve 212. The use of the snap fastener 216 eliminates the need to use an adhesive to mount the sleeve 212 onto the spacer 14 and the pipe 100. However, optionally, an adhesive can be used with the snap fastener 216. In an alternate method of installing the noise reduction system 10, the spacer 14 is first mounted to the inside surface of the sleeve 12. Next, the sleeve 12 with the spacer 14 is mounted on the outer surface of the pipe 100 or fitting. In one (1) embodiment, an outer band (not shown) is positioned around the outer surface of the sleeve 12 to assist in holding the sleeve 12 onto the pipe 100 or fitting. In the embodiment where the sleeve 12 and pipe 100 have a cylindrical shape, when the sleeve 12 is correctly mounted on the pipe 100, the center axis A-A of the sleeve 12 is essentially aligned with the center axis of the pipe 100 (FIG. 2). In one (1) embodiment, the pieces 12C and 12D act together to essentially cover the entire exposed, outer surface of the pipe 100.

In use, the mounting of the sleeve 12 spaced apart from the outer surface of the pipe 100 or fitting creates an air gap 16 between the pipe 100 or fitting and sleeve 12. The air gap 16 isolates the pipe 100 from the sleeve and the surrounding atmosphere and absorbs the sound being transmitted from the pipe 100 or fitting to reduce the noise levels of the pipe 100 reaching the sleeve 12 and the surrounding atmosphere. The sleeve 12 further helps to reduce the noise entering into the surrounding atmosphere from the pipe 100 or fitting. The air gap 16 may also reduce the noise emitted by the pipe 100 or fitting due to the vibration of the pipe 100 or fitting resulting from the flow of waste water through the pipe 100 or fitting.

The positioning of the sleeve 12 around and spaced apart from, the pipe 100 or fitting creates an air gap 16 around the pipe 100 or fitting which reduces the noise levels of the pipe 100 or fitting as a result of waste water flowing through the pipe 100. Table 1 shows the sound level in decibels (dB) for bare PVC pipe, cast iron pipe, and PVC pipe having the noise reduction system 10. Each type of pipe was tested by flushing the same 1.6 GPF bottom outlet water closet within the same mounting frame and using the same attachment method for each type of pipe.

TABLE 1

| Type of Pipe | Base Meter Setting dB | Meter Reading dB | Sound Level dB |
|---|---|---|---|
| Bare PVC | 70 | +6 | +76 |
| Cast Iron | 70 | +2 | 72 |
| PVC with Noise Reduction System | 70 | −3 | 67 |

Testing shows that the bare PVC pipe has a noise level eight (8) times greater than a PVC pipe 100 having the noise reduction system 10. Furthermore, the cast iron pipe has a noise level 3.2 times greater than a PVC pipe having the noise reduction system 10.

In the foregoing description, various features of the present invention are grouped together in one or more embodiments for the purpose of streamlining the disclosure. This method of disclosure is not to be interpreted as reflecting an intention that the claimed invention-requires more features than are expressly recited in each claim. Rather, as the following claims reflect, inventive aspects lie in less than all features of a single foregoing disclosed embodiment. Thus, the following claims are here by incorporated by reference herein in their entirety, with each claim standing on its own as a separate embodiment of the present invention.

It is intended that the foregoing description be only illustrative of the present invention and that the present invention be limited only by the hereinafter appended claims.

I claim:

1. A noise reduction system for reducing the noise level in a pipe of a DWV system, which comprises:
   a) a spacer mounted on an outer surface of the pipe; and
   b) a sleeve having a cylindrical shape similar to a shape of the pipe and constructed of a first piece and a second piece with each piece having an essentially semi-circular cross section, the first and second pieces having opposed ends with first and second edges extending between the ends, wherein a snap fastener is provided along the first and second edges of the first and second pieces such that a male portion of the snap fastener extends along the first edge of the first and second pieces and the female portion of the snap fastener extends along the second edge of the first and second pieces, wherein the sleeve is mounted on the spacer on a side opposite the pipe so that the sleeve is spaced apart from the outer surface of the pipe and an air gap is formed between the outer surface of the pipe and the sleeve wherein the air gap absorbs sound emitted by the pipe, wherein the spacer essentially completely fills a space between the pipe and the sleeve and wherein when the first and second pieces of the sleeve are mounted on the pipe, the male portion of the snap fastener engages the female portion of the snap fastener to secure the sleeve on the pipe.

2. The system of claim 1 wherein the spacer has a thickness of approximately 0.125 inches (3.175 mm) and the sleeve is spaced apart from the outer surface of the pipe a distance greater than 0.125 inches (3.175 mm).

3. The system claim 1 wherein the sleeve is constructed of PVC.

4. The system of claim 1 wherein the spacer is constructed of PVC and has a thickness of approximately 0.125 inches (3.175 mm) and wherein, the sleeve is constructed on PVC and is spaced apart from the outer surface of the pipe a distance greater than 0.125 inches (3.175 mm) so that the air gap has a thickness of at least 0.125 inches (3.175 mm).

5. The system of claim 1 wherein the sleeve has a thickness of approximately 0.09 inches (2.29 mm).

6. The system of claim 1 wherein the pipe has opposed ends with a length between the ends, wherein the sleeve has opposed ends and wherein a length of the sleeve between the ends is essentially equal to an exposed length of the pipe between the ends so that the sleeve essentially completely covers the exposed length of the pipe.

7. The system of claim 1 wherein the sleeve essentially surrounds the exposed outer surface of the pipe.

8. The system of claim 7 wherein the air gap essentially surrounds the exposed outer surface of the pipe.

9. The system of claim 1 wherein the sleeve is secured to the spacer by an adhesive.

10. A method for soundproofing a pipe constructed of PVC, the pipe having opposed ends forming a longitudinal axis of the pipe, which comprises the steps of:
    a) providing a sleeve having a first piece and a second piece, each piece having a first end and a second end forming a longitudinal axis of each piece;
    b) providing at least one spacer;
    c) mounting the spacer on an outer surface of the pipe so that the spacer completely encircles the pipe;
    d) mounting the first piece of the sleeve on the spacer so that the longitudinal axis of the first piece is parallel to the longitudinal axis of the pipe; and
    e) mounting the second piece of the sleeve on the spacer so that the longitudinal axis of the second piece is parallel to the longitudinal axis of the pipe wherein when the first and second pieces are mounted on the spacer on the pipe, the spacer essentially completely fills a space between the pipe and the sleeve, wherein an air gap is formed between the outer surface of the pipe and the sleeve and wherein the air gap acts to absorb sound emitted by the pipe.

11. The method of claim 10 wherein the first and second pieces have first and second edges extending between the first and second ends and wherein a snap fastener is provided on the first and second edges of the first and second pieces and wherein in step (e), the second piece is secured on the pipe by engaging the snap fastener on the first and second edges of the first piece with the snap fastener on the first and second edges of the second piece.

12. The method of claim 10 wherein the pipe has a cylindrical shape and the first and second pieces having a semicircular cross-section and wherein in step (e), when the first and second pieces are mounted on the spacer, the first and second pieces cover essentially an entire exposed length of the pipe between the ends so that the air gap surrounds the entire exposed length of the pipe.

\* \* \* \* \*

UNITED STATES PATENT AND TRADEMARK OFFICE
CERTIFICATE OF CORRECTION

PATENT NO. : 7,913,718 B1  
APPLICATION NO. : 12/348946  
DATED : March 29, 2011  
INVENTOR(S) : Kenneth R. Cornwall Page 1 of 1

It is certified that error appears in the above-identified patent and that said Letters Patent is hereby corrected as shown below:

Column 4, Line 34, - "net" should be changed to "set".

Column 6, Line 60, Claim 3, - after "system" insert -- of --.

Column 7, Line 1, Claim 5, - "1" should be changed to "4".

Signed and Sealed this  
Twenty-seventh Day of March, 2012

David J. Kappos  
*Director of the United States Patent and Trademark Office*